US012123287B2

(12) United States Patent
Meeranpillai et al.

(10) Patent No.: US 12,123,287 B2
(45) Date of Patent: Oct. 22, 2024

(54) DETERMINING DRAG REDUCING AGENTS' PERFORMANCE

(71) Applicant: Saudi Arabian Oil Company, Dhahran (SA)

(72) Inventors: Nagoorpitchai S. Meeranpillai, Al Khobar (SA); Ali Almuhaimeed, Al-Qatif (SA); Osama Alzahrani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 260 days.

(21) Appl. No.: 17/550,863

(22) Filed: Dec. 14, 2021

(65) Prior Publication Data
US 2023/0184067 A1 Jun. 15, 2023

(51) Int. Cl.
*G01N 11/14* (2006.01)
*E21B 43/12* (2006.01)

(52) U.S. Cl.
CPC .............. *E21B 43/12* (2013.01); *G01N 11/14* (2013.01)

(58) Field of Classification Search
CPC ............ E21B 43/12; G01N 2013/0216; G01N 19/02; G01N 11/14
USPC ............ 166/250.01, 250.15; 73/7, 10, 53.01, 73/53.05, 54.01, 54.35, 865.9, 866; 701/43, 50
See application file for complete search history.

(56) References Cited

U.S. PATENT DOCUMENTS 7,468,402 B2 12/2008 Yang et al.
8,043,388 B2 10/2011 Waters et al.
9,285,080 B2 3/2016 Fan et al.
(Continued)

FOREIGN PATENT DOCUMENTS

CN 108181205 A * 6/2018 ........... G01N 11/142
CN 110068523 A * 7/2019 ............. G01N 11/14
(Continued)

OTHER PUBLICATIONS

Chinaflo.com [online], "Oilfield Chemicals/DRA (Drag Reducing Agent) used for crude oil pipeline transportation," 2017, retried Oct. 1, 2021, retried from URL <https://www.chinafloc.com/DRA-Drag-reducing-agent-used-for-crude-oil-pipeline-transportation_1553.html>, 4 pages.
(Continued)

*Primary Examiner* — Robert R Raevis
(74) *Attorney, Agent, or Firm* — Fish & Richardson P.C.

(57) ABSTRACT

Systems and methods for evaluating a drag reducing agent's performance in a mixture are described. The system includes a measuring instrument with an rheometer; and a sensor system positioned inside the measuring instrument including a body with an open end and an extended end, wherein the extended end is directly attached to the measuring instrument; a cover with an inner disc and an outer disc and attachable to the body, the inner disc sized to be received by the open end of the body; the body and the cover form a sealable chamber; and a rotating disc with a bar and a plate, the bar is attached to the measuring instrument and the plate is positioned inside the body and operable to measure drag reducing agent's performance of the mixture; and a data acquisition and processing system is in electronic communication with the measuring instrument, and the sensor system.

14 Claims, 9 Drawing Sheets

(56) References Cited

U.S. PATENT DOCUMENTS

| | | | | |
|---|---|---|---|---|
| 2005/0132782 A1* | 6/2005 | Wallevik | ............... | G01N 11/14 |
| | | | | 73/54.28 |
| 2010/0004890 A1* | 1/2010 | Tonmukayakul | ...... | G01N 11/14 |
| | | | | 702/113 |
| 2019/0153304 A1 | 5/2019 | Zelenev | | |
| 2023/0273105 A1* | 8/2023 | Meeranpillai | .......... | G01N 11/14 |
| | | | | 73/54.32 |

FOREIGN PATENT DOCUMENTS

| | | | | |
|---|---|---|---|---|
| JP | 2019215277 A | * | 12/2019 | |
| WO | WO-9616323 A1 | * | 5/1996 | ............. G01N 11/14 |

OTHER PUBLICATIONS

Dennington et al., "Miniaturized rotating disc rheometer test for rapid screen of draft reducing marine coatings," Surf. Topog.: Metrol. Prop., Sep. 2015, 10 pages.

Hong et al., "Rotating disk apparatus for polymer-induced turbulent drafg reduction," Journal of Mechanical Science and Technology, 2008, 22:1908-1913, 6 pages.

Kim et al., "A high-precision rotating disk apparatus for drag reduction characterization," Polymer Testing, 2001, 20:43-48, 6 pages.

Liquidpower.com [online], "About DRA and How it works," 2021, retrieved Oct. 1, 2021, retrieved from URL <https://www.liquidpower.com/what-is-dra/about-dra-and-how-it-works>, 3 pages.

Schatcogmbh.com [online], "Draf Reducing Agent (DRA)," retrieved Oct. 1, 2021, retried from URL <https://schatcogmbh.com/product/drag-reducing-agent-dra/>, 2 pages.

\* cited by examiner

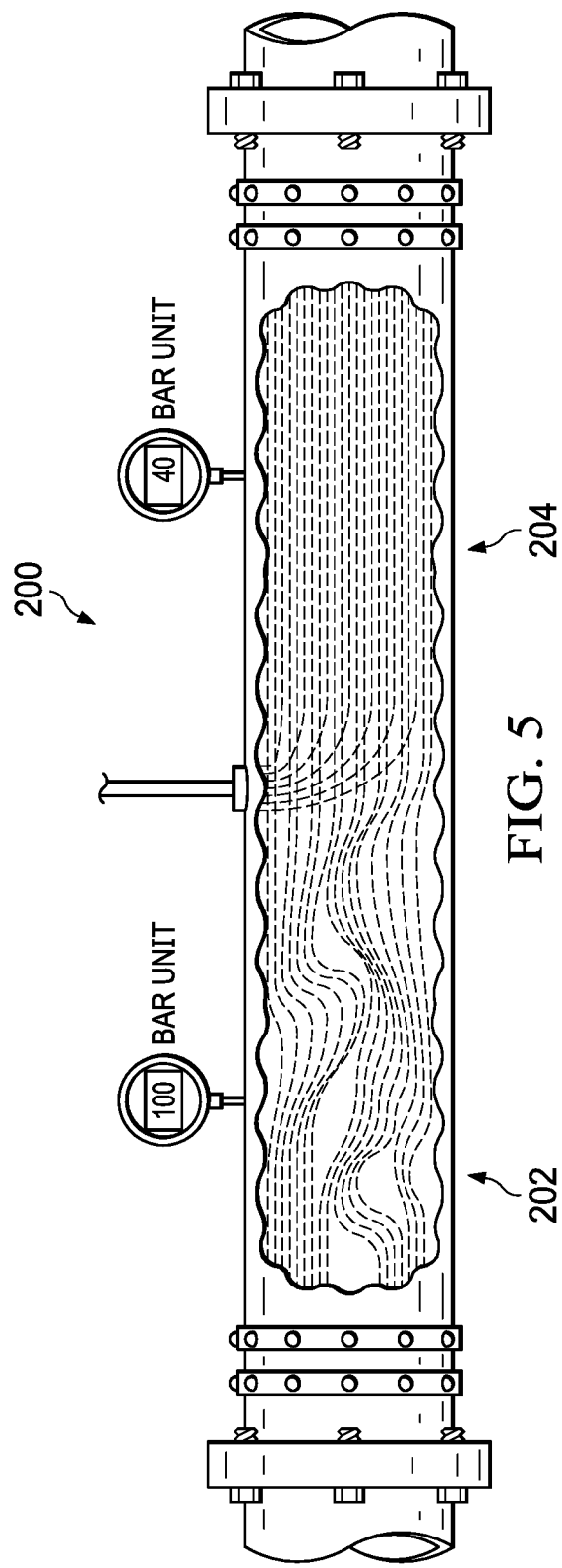

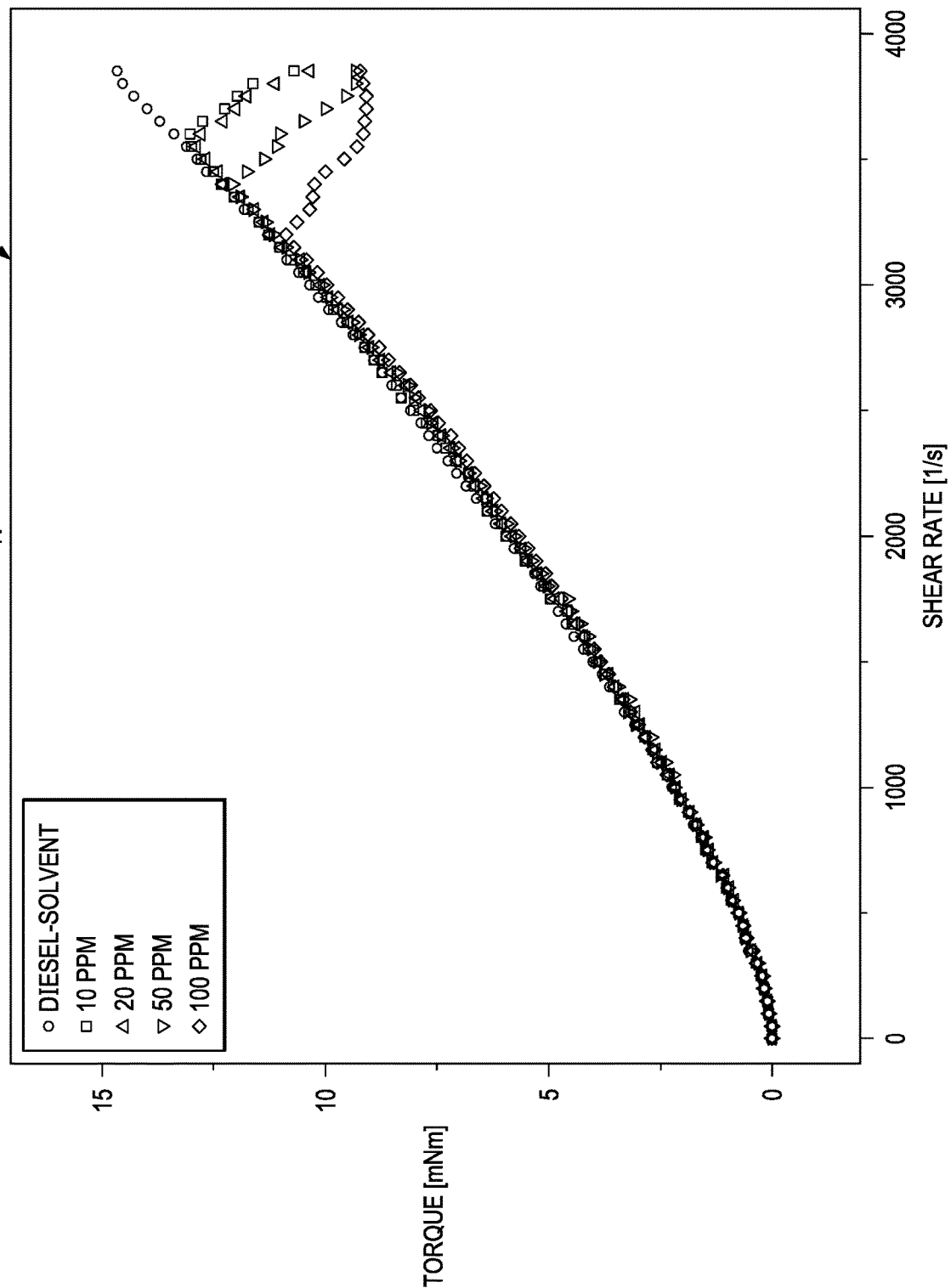

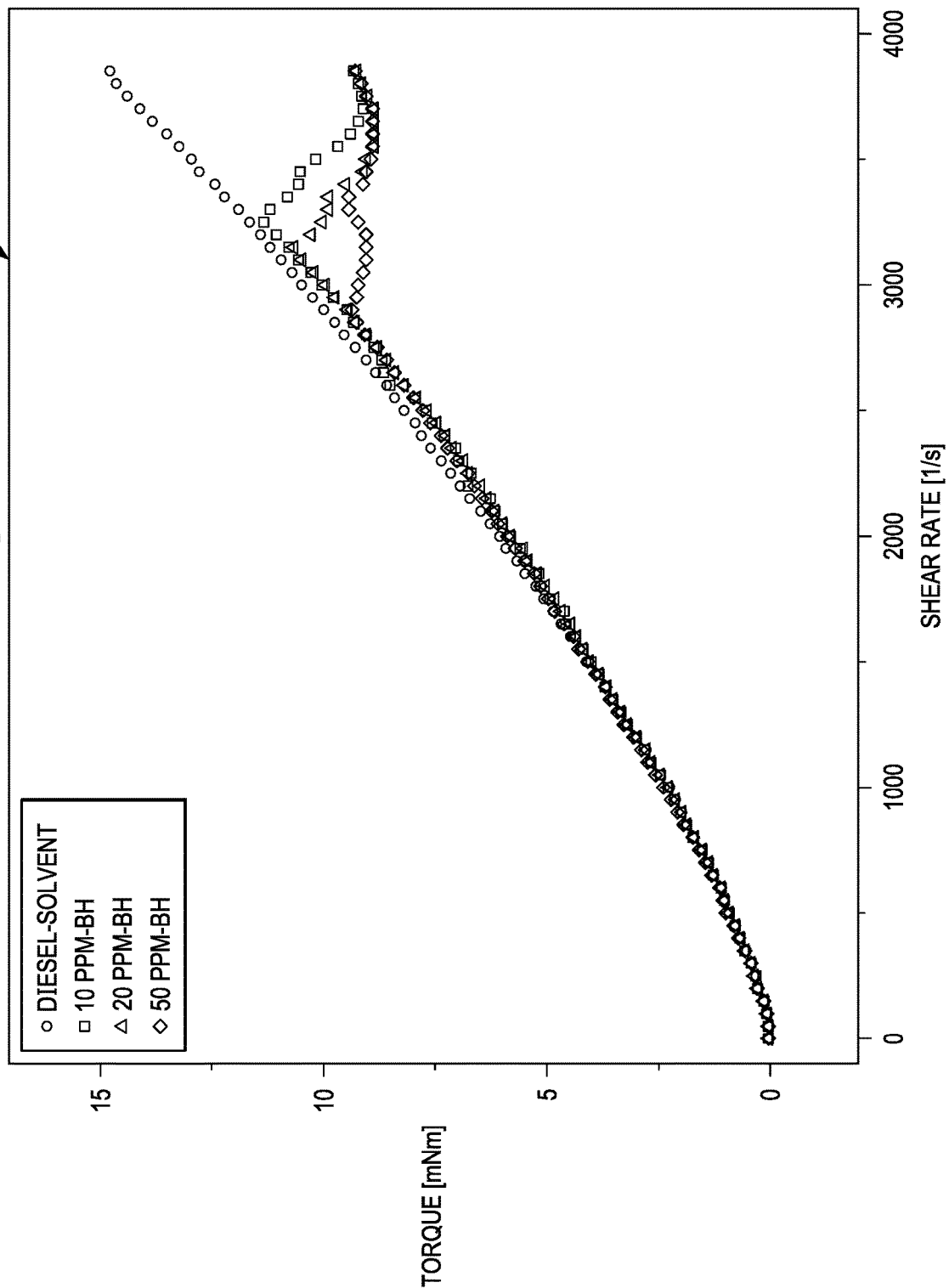

DETERMINING DRAG REDUCING AGENTS' PERFORMANCE

TECHNICAL FIELD

The present disclosure generally relates to systems and methods to evaluate drag reducing agents performance, more particularly sensing tools, systems, and methods that can be used to evaluate the performance of different drag reducing agents on fluid characteristics in pipelines.

BACKGROUND

Introducing small amounts (e.g., in parts per million (ppm)) of drag reducing agent additives (e.g., polymers, solid-particle suspensions, biological additives, or surfactants) into fluids (e.g., crude oil or oil products) can change the flow behavior of the fluids in a pipeline. For example, addition of polymers can change the fluid flow in a pipeline from turbulent to laminar flow, increasing pipeline capacity and enhancing flow rates.

Industrial approaches to evaluate drag reducing agent's performance often include use of a fluid flow loop method. The fluid flow loop method measures drag reduction (or torque reduction) from addition of various polymer-based drag reducing agents. This approach use large amounts of fluids (e.g., more than 10 barrels) and resources.

SUMMARY

This specification describes tools, systems, and methods that can be used to test and evaluate the performance of different drag reducing additives on fluid characteristics in pipelines. The test tool includes a measuring instrument, a sensor system, and a data acquisition and processing system. The measuring instrument has an enclosure that receives the sensor system. The sensor system has a body with an open end (e.g., cup) that serves as a sample holder, a rotating disc, and a cover that can be attached to the body. The body and the cover form a sealable chamber.

In operation, the rotating disc is placed inside the body of the sealable chamber. The body is filled with a mixture that includes oil mixed with drag reducing agent. When the cover is connected to the body, the rotating disc is submerged into the mixture inside the body. The sensor system is a closed loop system that automatically determines the effectiveness of each drag reducing agent under test by measuring the drag reduction (or torque reduction) using the rotating disc at various rotational speeds and different viscosities of the mixture.

The sensor system includes sensors, instrumentation and signal processing circuits, receivers, transmitters, and data storing and processing devices. The sensor system acquires real-time measurement data of the mixture sample and transfers it to the data acquisition and processing system for analysis and calculations. The method automatically identifies the performance of drag reducing agents once the data is collected. Results and technical reports can be sent directly to the customers without lengthy analysis.

The tools, systems, and methods described in this specification can accurately evaluate the effectiveness of the drag reducing agents on various liquids (e.g., diesel, gasoline, crude oil) or evaluate properties of solvents alone. Specifically, this approach measures drag reduction which reflects the ability of the drag reducing agent to reduce turbulence in flow streams. The approach can also measure viscosity reduction which demonstrates reduction of friction in pipelines. The measurements are performed using a rheometer with a sensing system. The method allows direct addition of drag reducing agent into small quantity of oil (e.g., 100 milliliters (ml)) which reduces health and environmental concerns and required experimental time and resources. The modified rheometer that includes the disc sensor and the body is pre-programed and can run the experiment automatically. This measuring approach is simple and provides increased accuracy, relative to other industrial approaches that use large amount of fluids and resources to evaluate the performance of drag reducing agents.

In some aspects, a system for evaluating a drag reducing agent's performance in a mixture includes a measuring instrument including an rheometer; and a sensor system positioned inside the measuring instrument. The sensor system includes a body with an open end and an extended end, the extended end is directly attached to the measuring instrument; a cover with an inner disc and an outer disc and attachable to the body, the inner disc sized to be received by the open end of the body; the body and the cover form a sealable chamber; and a rotating disc with a bar and a plate, the bar is attached to the measuring instrument and the plate is positioned inside the body and operable to measure drag reducing agent's performance of the mixture; and a data acquisition and processing system is in electronic communication with the measuring instrument, and the sensor system.

Embodiments of the system for evaluating a drag reducing agent's performance in a mixture can include one or more of the following features.

In some embodiments, the inner disc is smaller in size than the outer disc.

In some embodiments, the rotating disc includes a sensor operable to measure drag reduction or torque inside the body. In some cases, the sensor includes a metal material and is operable to measure viscosity of the mixture.

In some embodiments, the data acquisition and processing system includes user interface operable to display graphical results from testing.

In some embodiments, the system for evaluating a drag reducing agent's performance in a mixture is a closed loop system.

In some embodiments, the plate has diameter between 50 and 100 mm.

In some cases, a method for evaluating a drag reducing agent's performance in a mixture includes installing a body in a measuring instrument and loading the mixture into the body; lowering a sensing disc into the mixture of the body and closing the body by attaching a cover; measuring a drag reduction data of the mixture at a plurality of rotational speeds and a viscosity data using the sensing disc; displaying a plurality of graphical results on a user interface using a data acquisition and processing system; and selecting an amount and a type of drag reducing agent to be used for a specific mixture.

Embodiments of the method for evaluating a drag reducing agent's performance in a mixture can include one or more of the following features.

In some embodiments, the method includes mixing a petroleum product with a polymer-based drag reducing agent to form the mixture.

In some embodiments, the method includes a measuring instrument such as is a rheometer.

In some embodiments, the method includes measuring torque reduction data of the mixture.

In some embodiments, the method includes characterizing the fluid flow as a turbulent or a laminar flow.

In some embodiments, the method includes processing of a measured data using a data acquisition and processing system. In some cases, the method includes selecting the amount and the type of drag reducing agent that reduces a torque at low shear rates.

In some embodiments, the method includes measuring a change in friction upon adding a drag reducing agent.

The described approach can obtain measurements to accurately select the appropriate dosage of drag reducing agents for different type of liquids of petroleum products. This allows reduction of drag in flowlines by addition of small amounts of drag reducing agents and eliminates resistance of flow in pipelines. The automated method can reduce cost by avoiding usage of excess amounts of drag reducing agents in flowlines. Drag reducing agent manufacturers can apply the described analytical method to improve chemical production and enhance product quality. Drag reducing agents (DRAs) are polymers with high molecular weight. These polymers can decrease the turbulence (i.e., drag) flow in the flowlines. The chemistry of the DRA polymers includes long chain with high molecular weight of macromolecules. Increasing molecular weight or substituting monomers can improve the drag reduction performance. Different polymer can have different physical characteristics and surface contact ability. The DRA polymers can be sensitive (e.g., unstable) in high shear and high temperature environments. The physical properties of DRAs from different manufactures can vary as well as their performance. The described method can be used for manufacturing of different molecular weight polymers and to evaluate their performance.

The details of one or more embodiments of these systems and methods are set forth in the accompanying drawings and the description below. Other features, objects, and advantages of these systems and methods will be apparent from the description, drawings, and the claims.

DESCRIPTION OF DRAWINGS

FIG. 5 is a schematic illustrating flow characteristics in a pipeline.

FIGS. 6A-6C are charts of measured drag reducing agents' performance in oil.

DETAILED DESCRIPTION

This specification describes tools, systems, and methods that can be used to test and evaluate the performance of different drag reducing additives on fluid characteristics in pipelines. The test tool includes a measuring instrument, a sensor system, and a data acquisition and processing system. The measuring instrument has an enclosure that receives the sensor system. The sensor system has a body with an open end (e.g., cup) that serves as a sample holder, a rotating disc, and a cover that can be attached to the body. The body and the cover form a sealable chamber.

In operation, the rotating disc plate is placed inside the body of the sealable chamber. The body is filled with a mixture that includes oil mixed with drag reducing agent. When the cover is connected to the body, the rotating disc is submerged into the mixture inside the body. The sensor system is a closed loop system that automatically determines the effectiveness of each drag reducing agent under test by measuring the drag reduction (or torque reduction) using the rotating disc at various rotational speeds and various viscosities of the mixture.

The sensor system includes sensors, instrumentation and signal processing circuits, receivers, transmitters, and data storing and processing devices. The sensor system acquires real-time measurement data of the mixture sample and transfers it to the data acquisition and processing system for analysis and calculations. The method automatically identifies the performance of drag reducing agents once the data is collected. Results and technical reports can be sent directly to the customers without lengthy analysis.

The tools, systems, and methods described in this specification can accurately evaluate the effectiveness of the drag reducing agents on various liquids (e.g., diesel, gasoline, crude oil) or evaluate properties of solvents alone. Specifically, this approach measures drag reduction which reflects the ability of the drag reducing agent to reduce turbulence in flow streams. The approach can also measure viscosity reduction which demonstrates reduction of friction in pipelines. The measurements are performed using a rheometer with a sensing system. The method allows direct addition of drag reducing agent into small quantity of oil (e.g., 100 ml) which reduces health and environmental concerns and required experimental time and resources. The modified rheometer that includes the dis sensor and the body is pre-programed and can run the experiment automatically. This measuring approach is simple and provides increased accuracy, relative to other industrial approaches that use large amount of fluids and resources to evaluate the performance of drag reducing agents.

Figure 1:
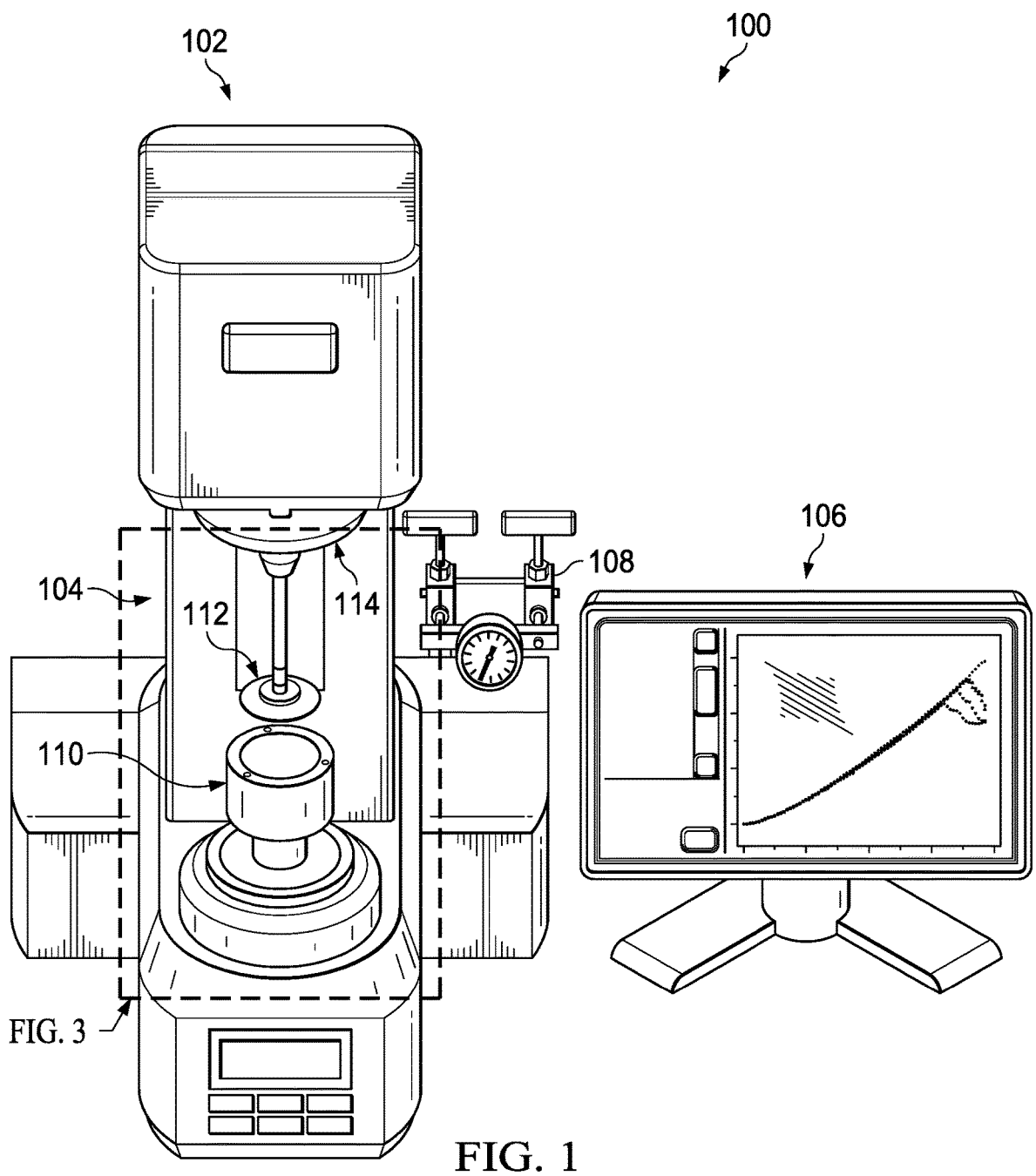
FIG. 1 is a perspective view of an automated test tool that includes a rheometer.

FIG. 1 is a perspective view of an automated test tool 100 that includes a rheometer 102. The automated test tool 100 enables screening of various drag reducing agents for their effect on the fluid characteristics. Automating the test tool 100 allows direct addition of a drag reducing agent to a petroleum product and measuring the changes of the fluid characteristics. As illustrated, the test tool 100 includes the rheometer 102, the sensor system 104, and the data acquisition and processing system 106. The rheometer 102 includes side pressure gages 108 that read pressure during testing. In preparation for testing, a mixture of oil and the drag reducing agent is poured into a body or sample holder 110 that is part of the sensor system 104 and is installed in the rheometer 102. For example, the rotating disc 112 is lowered into the body 110 and submerged into the mixture. The cover 114 is attached to the body 110 and the sensor system 104 is closed and ready to start measurements. Once testing parameters are set by the user using the data acquisition and processing system 106, the collected results are displayed on a user interface via system software (e.g., Rheowin software). During test, the DRA performance is measured by measuring torque or viscosity. The torque is measured in Newton meter (N-m). The viscosity is measured in Newton-second per square meter ($N\cdot s/m^2$), which is usually expressed as Pascal-second or centipoise (1 cP=$10^{-3}$ Pa·s=1 mPa·s).

Figure 2B:
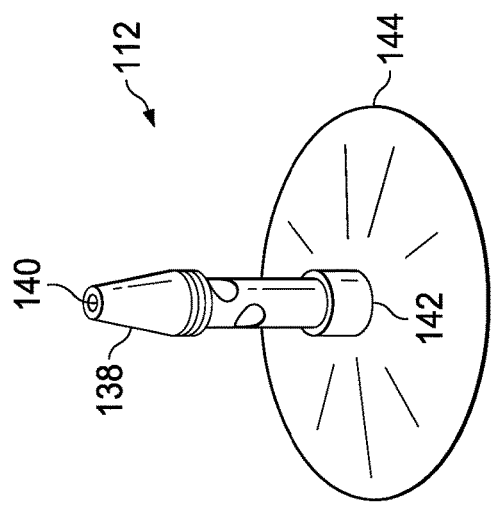
FIGS. 2A-2C are perspective views of the sensor system including a disc sensor.
Figure 2C:
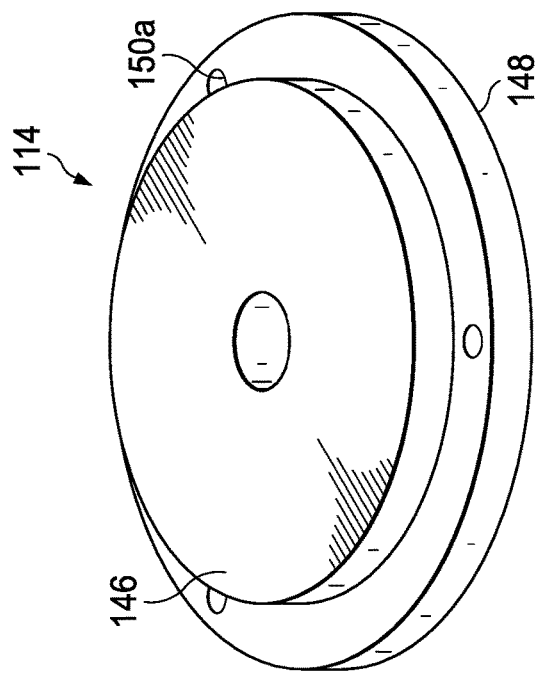
Figure 2A:
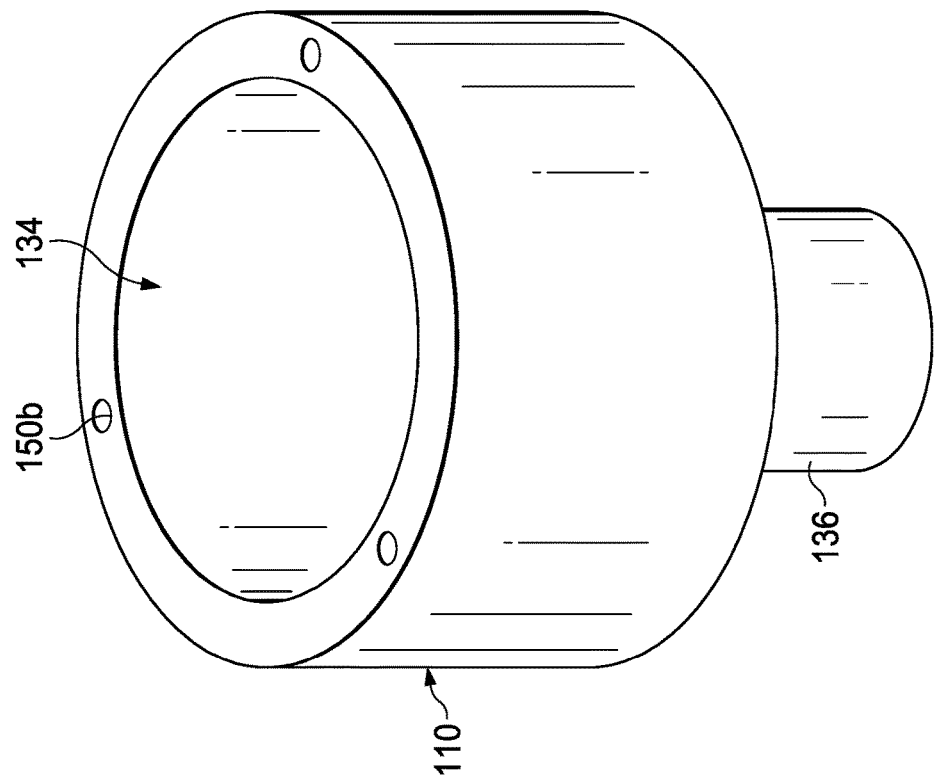

FIGS. 2A-2C are perspective views of the sensor system 104, including a disc sensor 112. The sensor system 104 includes the body 110 with an open end 134, the rotating disc 112, and the cover 114. The body 110 has an extended end 136 that allows for the body 110 to be locked in place when installed inside the rheometer 102. The body 110 can include material such as metal, polymer, composite, or combination thereof. For example, the body 110 includes aluminum. The rotating disc 112 can have a bar 138 extending perpendicular to a plate 144. The bar 138 can be a cylinder with a top end 140 with shape of a cone. The top end 140 allows the rotating disc 112 to be connected to the rheometer 102. The plate 144 is attached to the bottom end 142 of the bar 138. The plate 144 is submerged into the mixture inside the body 110 as previously explained in reference to FIG. 1. The plate 144 has a shape of a disc. In some implementations, the plate 144 has cylindrical or a cone shape. In some implementation, the size of plate 144 is adapted to complement the rotational speeds of the flow behavior of the fluids under test. For example, the plate 144 has diameter between 25 mm and 50 mm The top and the bottom surface of the plate 144 have flat (i.e., plane) shape. The experimented rotating disc plate diameter was 50 millimeter and the plate edge (144) thickness 2 millimeter. For example, the plate 144 is a sensor. The plate 144 includes a non-corrosive metal material (e.g., stainless steel) and a working range of between 50 and 100 mm. In some implementations, the plate 144 includes aluminum material. The plate 144 facilitates torque or viscosity measurements for a liquid sample.

The cover 114 includes an outer disc 148 and an inner disc 146. The outer disc 148 has the same diameter as the overall size of the body 110. The inner disc 146 has the same diameter as the open end 134 of the body 110. For example, the outer disc 148 has a diameter of 73 millimeters (or 7.3 cm), and the inner disc 146 has a diameter of 53 millimeters (or 5.3 cm). For example, the outer disc 148 and the inner disc 146 are made from aluminum material. In some implementations, the outer disc 148 and the inner disc 146 are made from stainless steel material. Once the rotating disc 112 is placed inside the body 110, the cover 114 is placed on top of and connected to the body 110 using three screws/pins (not shown in the drawings). The pins are placed inside of three equally spaced holes 150. One set of holes 150a are equally spaced on the outer disc 148 and the other set of respective mating holes 150b are equally spaced on the body 110. The holes 150 are defined in the outer disc 148. The cover 114 and the body 110 together form a sealable chamber. The described structural assembly shows the advantages of using the plate 144 with 50 mm in diameter that yields more robust results. The sensitivity for the working range increases when a plate with bigger diameter is used for testing.

Figure 3:
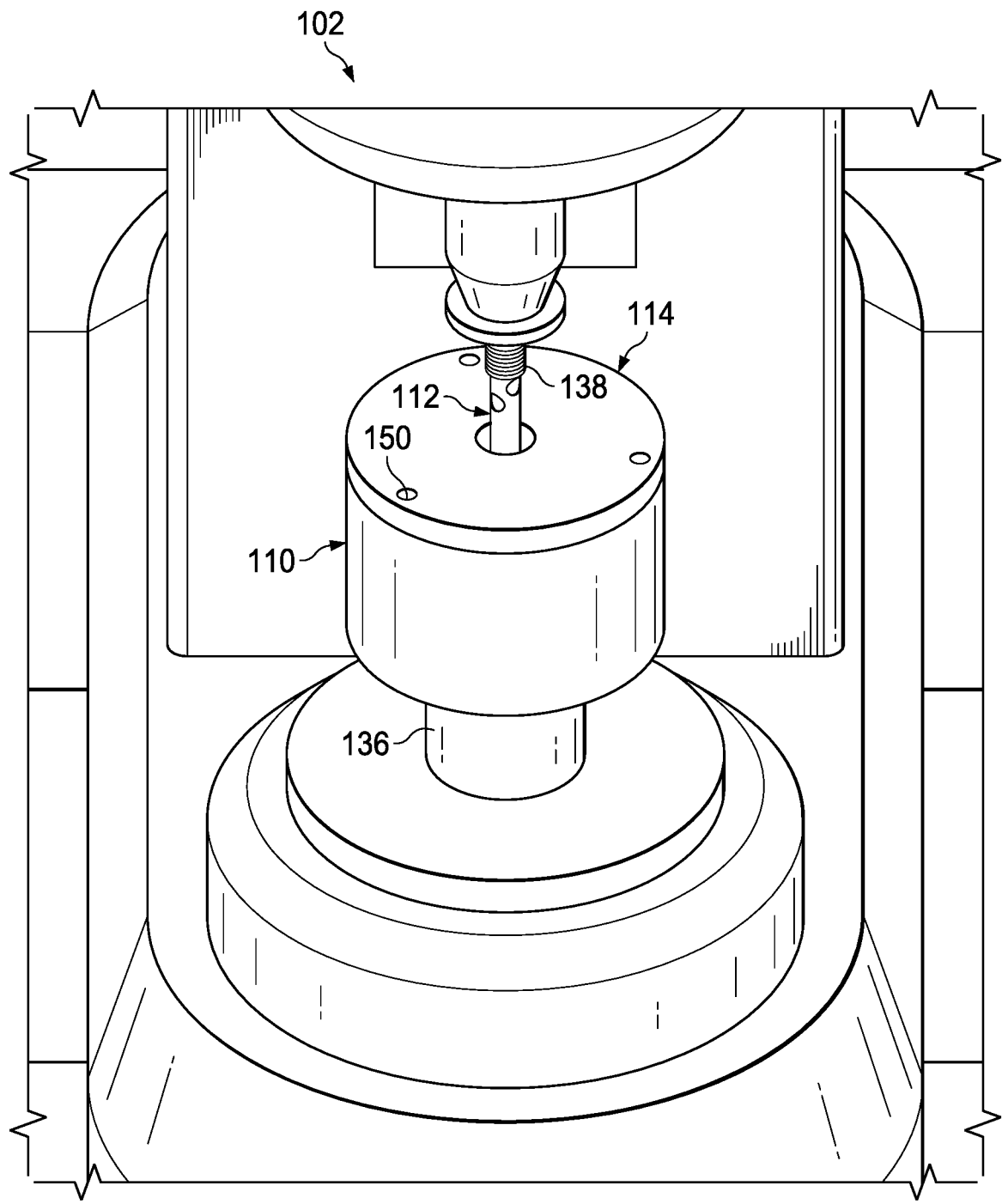
FIG. 3 is a perspective of the rheometer with the sensor system installed.

FIG. 3 is a perspective view of the rheometer 102 with the sensor system 104 installed. As illustrated, parts of the sensor system 104 are connected and installed in the rheometer 102 ready for the test of determining drag reducing agent performance to begin.

Figure 4:
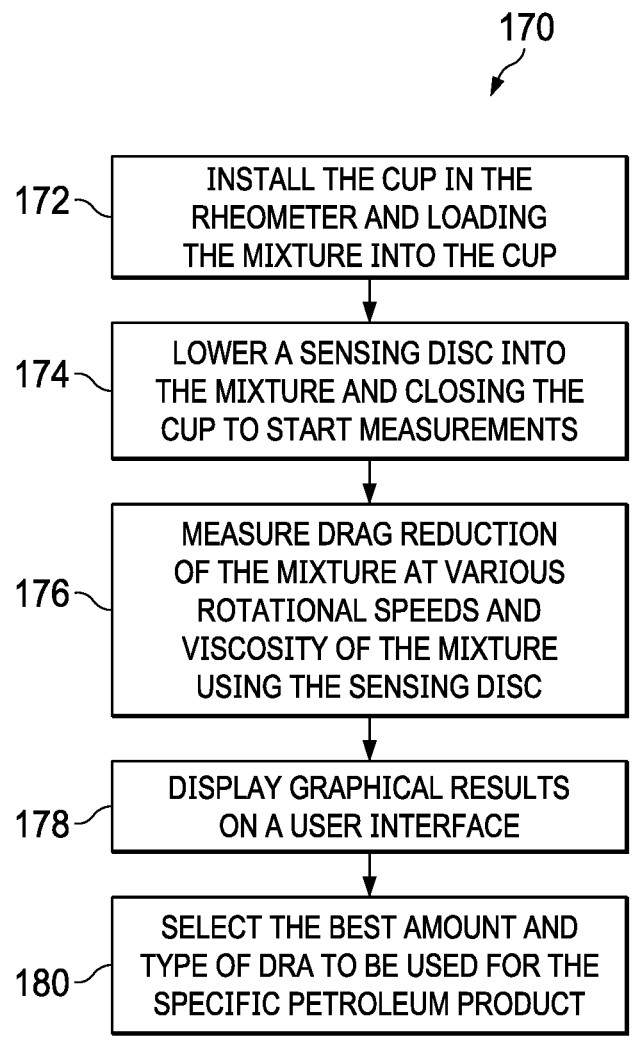
FIG. 4 is a flow chart of a method for determining a performance of a drag reducing agent.

FIG. 4 is a flow chart of a method 170 for determining drag reducing agent's performance. The rheometer 102 together with the sensor system 104 (FIG. 3) forms a closed loop system that automatically determines the effectiveness of each drag reducing agent under test. At step 172, the body 110 is installed into the rheometer 102 and the mixture including the crude oil and the drag reducing agent is loaded into the body 110 of the rheometer 102. At step 174, the sensing disc 112 is submerged into the mixture, and the body 110 is closed using cover 114. At step 176, the measurements are collected. The disc 112 rotates inside the body 110 at a set speed by the user. This determines the shear rate inside the body 110. For example, several different shear rates can be used during testing such as 0.1, 5, 10, 50, 100, 200, 300, 600 cm/s or any other value in the range between 0.1 and 600 cm/s. The shear rate is defined as a relative motion between adjacent layers of a moving fluid. The shear rate is a function of the distance over time. During testing, the liquid mixture tends to drag the disc 112, and the force it exerts (i.e., torque) on both the body 110, and the disc 112 is measured and converted to a shear rate. This allows to determine the flow characteristics of the mixture that includes the drag reducing agent inside the body 110. The viscosity of the mixture is also measured during test. The flow can be characterized as a turbulent or a laminar flow based on measured shear rates, viscosity, and pressure drops during test. In the described method a closed cup with a plate sensor are used to evaluate the performance of the DRA chemicals.

FIG. 5 is a schematic illustrating flow characteristic in a pipeline 200. For example, in the first region 202 with pressure of 100 bars interaction between the fluid and the walls causes turbulent flow. In the second region 204, as the pressure drops to 40 bars (e.g., by addition of drag reducing additive downstream), the flow becomes laminar. For example, a diesel solvent is used and three different types of drag reducing agents (e.g., K, Q, and B). For each mixture combination (e.g., diesel with K, diesel with Q, and diesel with B), the drag reducing agent is added in various amounts (e.g., 10, 20, 50, and 100 ppm) and torque was measured at various rotational speeds for each case. Flowing crude oil in pipes pushes up against the inside wall of the pipe, the pipe pushes the oil back down causing a swirling of turbulence to occur which creates a drag force. This drag force in flowlines decreases the capacity of the pipe. To reduce the turbulence in pipelines DRAs are used as additives in petroleum products. Small amounts of DRAs (parts per million) can interact with the crude oil and the wall of the pipe to reduce friction by forming a thin film on the inner surface of the pipe. In operation, the sensor 144 is submerged in a liquid (e.g., crude oil) which can create friction on both side of the sensor 144. The rheometer measures the friction (e.g., viscosity) or the forces (e.g., drag) at different rotational speeds (e.g., shear rate) or torque. The test disc 112 is closed with the outer body 110 and outer disc 114. The next step is to add a small amount of DRA and measure the change in friction. As described earlier in reference to FIG. 2 the bigger the diameter of the plate 144 the change in friction measurements are more robust. In the described method a plate with 50 mm diameter was used.

Figure 6B:
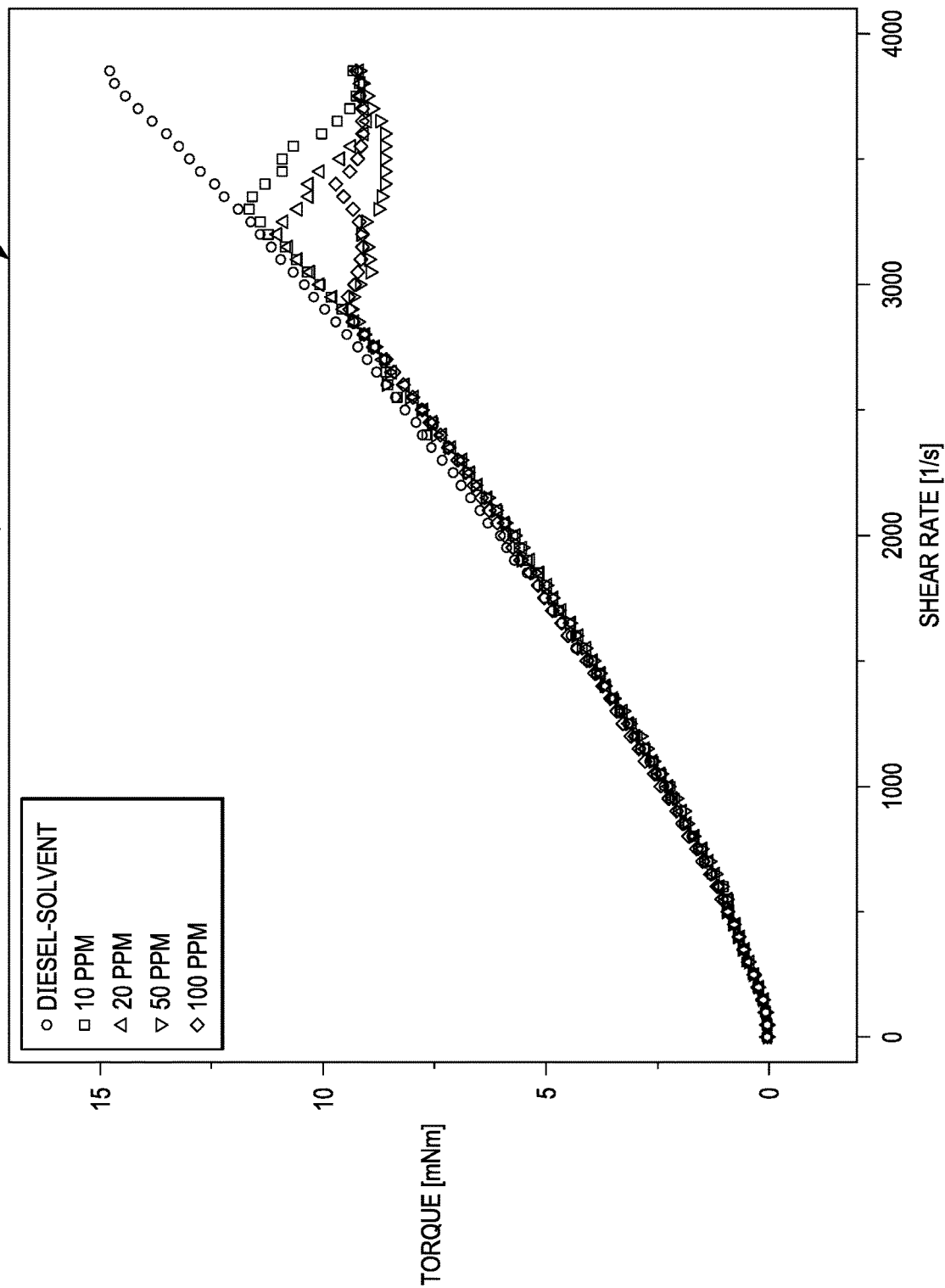

FIGS. 6A-6C are charts 224, 244, 264 of measured different drag reducing agents' performance in each case. It can be observed that the torque is not prominent at lower rotational speeds and increasing the concentration of drag reducing agent, for each case, reduces the torque. This brings the flow to have more of a laminar characteristic. It is expected that a turbulent flow forms at high shear environments and at low shear environment a laminar flow forms. In petroleum products the turbulent flow can be formed in medium to high shear environments. As illustrated, for diesel liquid and DRA polymers concentration of 0 ppm change in torque is not present at shear rates of between 0.1 and 3900 cm/s which is considered a low to high shear environment. For example, a 10 ppm of polymer A can reduce torque at the shear rate of 3550 cm/s and the 100 ppm of polymer A can reduce the torque at the shear rate of 3200 cm/s. For example, a 10 ppm of polymer B can reduce torque at the shear rate of 3400 cm/s and the 100 ppm of polymer B can reduce the torque at the shear rate of 2950 cm/s. For example, a 10 ppm of polymer C can reduce torque at the shear rate of 3200 cm/s and the 100 ppm of polymer C can reduce the torque at the shear rate of 2800 cm/s. When the DRA polymer reduces the torque at low shear rates it is considered to be the most performing DRA polymer. As illustrated, DRA polymer C is the best performer compared to polymers A and B. The amount of the DRA polymer present can also influence the results.

At step 178, the measured drag reducing agents' performance in each case (FIGS. 6A-6C) is transferred in-situ and graphically displayed on a user interface using data acquisition and processing system 106. At step 180, the graphical distribution of the results helps the user to select the right dosage and type of drag reducing agent that is most suitable for the specific petroleum product. The described approach can also be used in designing of pump impellers or choosing pipe diameters for flow lines.

Figure 7:
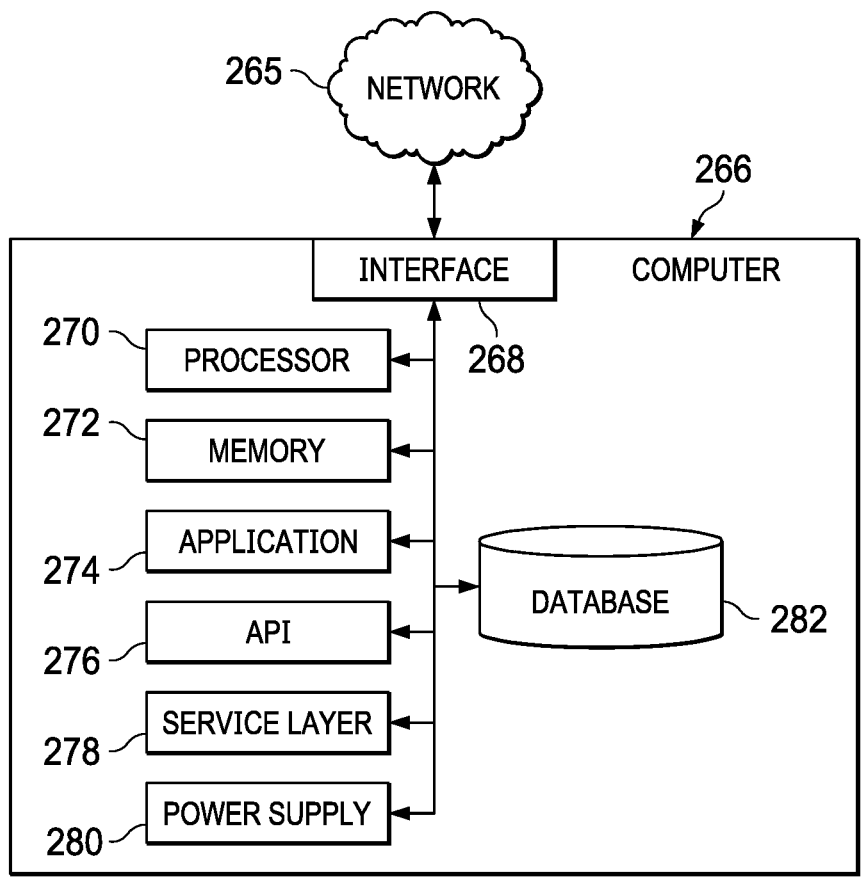
FIG. 7 is a block diagram of an example computer system.

FIG. 7 is a block diagram of an example computer system 266 used to provide computational functionalities associated with described algorithms, methods, functions, processes, flows, and procedures described in the present disclosure, according to some implementations of the present disclosure. The illustrated computer 266 is intended to encompass any computing device such as a server, a desktop computer, a laptop/notebook computer, a wireless data port, a smartphone, a personal data assistant (PDA), a tablet computing device, or one or more processors within these devices, including physical instances, virtual instances, or both. The computer 266 can include input devices such as keypads, keyboards, and touch screens that can accept user information. Also, the computer 266 can include output devices that can convey information associated with the operation of the computer 266 The information can include digital data, visual data, audio information, or a combination of information. The information can be presented in a graphical user interface (UI) (or GUI).

The computer 266 can serve in a role as a client, a network component, a server, a database, a persistency, or components of a computer system for performing the subject matter described in the present disclosure. The illustrated computer 266 is communicably coupled with a network 265. In some implementations, one or more components of the computer 266 can be configured to operate within different environments, including cloud-computing-based environments, local environments, global environments, and combinations of environments.

At a high level, the computer 266 is an electronic computing device operable to receive, transmit, process, store, and manage data and information associated with the described subject matter. According to some implementations, the computer 266 can also include, or be communicably coupled with, an application server, an email server, a web server, a caching server, a streaming data server, or a combination of servers.

The computer 266 can receive requests over network 265 from a client application (for example, executing on another computer 266). The computer 266 can respond to the received requests by processing the received requests using software applications. Requests can also be sent to the computer 266 from internal users (for example, from a command console), external (or third) parties, automated applications, entities, individuals, systems, and computers. Each of the components of the computer 266 can communicate using a system bus. In some implementations, any or all of the components of the computer 266, including hardware or software components, can interface with each other or the interface 268 (or a combination of both), over the system bus. Interfaces can use an application programming interface (API) 276, a service layer 278, or a combination of the API 276 and service layer 278. The API 276 can include specifications for routines, data structures, and object classes. The API 276 can be either computer-language independent or dependent. The API 276 can refer to a complete interface, a single function, or a set of APIs.

The service layer 278 can provide software services to the computer 266 and other components (whether illustrated or not) that are communicably coupled to the computer 266. The functionality of the computer 266 can be accessible for all service consumers using this service layer. Software services, such as those provided by the service layer 278, can provide reusable, defined functionalities through a defined interface. For example, the interface can be software written in JAVA, C++, or a language providing data in extensible markup language (XML) format. While illustrated as an integrated component of the computer 266, in alternative implementations, the API 276 or the service layer 278 can be stand-alone components in relation to other components of the computer 266 and other components communicably coupled to the computer 266. Moreover, any or all parts of the API 276 or the service layer 278 can be implemented as child or sub-modules of another software module, enterprise application, or hardware module without departing from the scope of the present disclosure.

The computer 266 includes an interface 268. Although illustrated as a single interface 268 in FIG. 7, two or more interfaces 268 can be used according to particular needs, desires, or particular implementations of the computer 266 and the described functionality. The interface 268 can be used by the computer 266 for communicating with other systems that are connected to the network 265 (whether illustrated or not) in a distributed environment. Generally, the interface 268 can include, or be implemented using, logic encoded in software or hardware (or a combination of software and hardware) operable to communicate with the network 265. More specifically, the interface 268 can include software supporting one or more communication protocols associated with communications. As such, the network 265 or the interface's hardware can be operable to communicate physical signals within and outside of the illustrated computer 266.

The computer 266 includes a processor 270. Although illustrated as a single processor 270 in FIG. 7, two or more processors 270 can be used according to particular needs, desires, or particular implementations of the computer 266 and the described functionality. Generally, the processor 270 can execute instructions and can manipulate data to perform the operations of the computer 266, including operations using algorithms, methods, functions, processes, flows, and procedures as described in the present disclosure.

The computer 266 also includes a database 282 that can hold data for the computer 266 and other components connected to the network 265 (whether illustrated or not). For example, database 282 can be an in-memory, conventional, or a database storing data consistent with the present disclosure. In some implementations, database 282 can be a combination of two or more different database types (for example, hybrid in-memory and conventional databases) according to particular needs, desires, or particular implementations of the computer 266 and the described functionality. Although illustrated as a single database 282 in FIG. 7, two or more databases (of the same, different, or combination of types) can be used according to particular needs, desires, or particular implementations of the computer 266 and the described functionality. While database 282 is illustrated as an internal component of the computer 266, in alternative implementations, database 282 can be external to the computer 266.

The computer 266 also includes a memory 272 that can hold data for the computer 266 or a combination of components connected to the network 265 (whether illustrated or not). Memory 272 can store any data consistent with the present disclosure. In some implementations, memory 272 can be a combination of two or more different types of memory (for example, a combination of semiconductor and magnetic storage) according to particular needs, desires, or particular implementations of the computer 266 and the described functionality. Although illustrated as a single memory 272 in FIG. 7, two or more memories 272 (of the same, different, or combination of types) can be used according to particular needs, desires, or particular implementations of the computer 266 and the described functionality. While memory 272 is illustrated as an internal component of the computer 266, in alternative implementations, memory 272 can be external to the computer 266.

The application 274 can be an algorithmic software engine providing functionality according to particular needs, desires, or particular implementations of the computer 266 and the described functionality. For example, application 274 can serve as one or more components, modules, or applications. Further, although illustrated as a single application 274, the application 274 can be implemented as multiple applications 274 on the computer 266. In addition, although illustrated as internal to the computer 266, in alternative implementations, the application 274 can be external to the computer 266.

The computer 266 can also include a power supply 280. The power supply 280 can include a rechargeable or non-rechargeable battery that can be configured to be either user- or non-user-replaceable. In some implementations, the power supply 280 can include power-conversion and management circuits, including recharging, standby, and power management functionalities. In some implementations, the power-supply 280 can include a power plug to allow the computer 266 to be plugged into a wall socket or a power source to, for example, power the computer 266 or recharge a rechargeable battery.

There can be any number of computers 266 associated with, or external to, a computer system containing computer 266, with each computer 266 communicating over network 265. Further, the terms "client," "user," and other appropriate terminology can be used interchangeably, as appropriate, without departing from the scope of the present disclosure. Moreover, the present disclosure contemplates that many users can use one computer 266 and one user can use multiple computers 266.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially-generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A system for evaluating a drag reducing agent's performance in a mixture, the system comprising:
   a measuring instrument;
   a sensor system positioned inside the measuring instrument comprising:
      a body with an open end and an extended end, wherein the extended end is directly attached to the measuring instrument;
      a cover with an inner disc and an outer disc and attachable to the body, the inner disc sized to be received by the open end of the body,
         wherein the inner disc and the outer disc are circular shaped discs,
         wherein the outer disc and a portion of the body that receives the outer disc have the same diameter, and
         wherein the body and the cover form a sealable chamber; and
      a rotating body comprising a bar-shaped cylinder and a plate,
         wherein the bar-shaped cylinder is attached to the measuring instrument and the plate is positioned inside the body and operable to measure drag reducing agent's performance of the mixture, and
         wherein the bar-shaped cylinder has a top end having a shape of a cone,
         wherein the top end is connected to a portion of the measuring instrument; and
      a data acquisition and processing system that is in electronic communication with the measuring instrument, and the sensor system.

2. The system of claim 1, wherein the inner disc is smaller in size than the outer disc.

3. The system of claim 1, wherein the plate of the rotating body is operable to measure drag reduction or torque inside the body.

4. The system of claim 3, wherein the plate of the rotating body comprises a metal material and is operable to measure viscosity of the mixture.

5. The system of claim 1, wherein the data acquisition and processing system includes user interface operable to display graphical results from testing.

6. The system of claim 1, wherein the sensor system is an integrated real-time analysis and reporting system configured to acquire real-time measurement data associated with the drag reducing agent's performance and transmit a report associated with the real-time measurement data to a user.

7. The system of claim 1, wherein the plate has diameter between 50 and 100 mm.

8. A method for evaluating a drag reducing agent's performance in a mixture, the method comprising:
   installing a body in a measuring instrument and loading the mixture into the body;
   lowering a rotating body of the measuring instrument into the mixture of the body and closing the body by attaching a cover,
      wherein the rotating body comprises a bar-shaped cylinder and a plate,
      wherein the bar-shaped cylinder is attached to the measuring instrument and the plate is positioned inside the body and operable to measure the drag reducing agent's performance of the mixture,
      wherein the cover comprises an inner disc and an outer disc and attachable to the body, the inner disc sized to be received by the open end of the body,
      wherein the inner disc and the outer disc are circular shaped discs, and
      wherein the outer disc and a portion the body that receives the outer disc have the same diameter,
   measuring a drag reduction data of the mixture at a plurality of rotational speeds and a viscosity data using the rotating body;
   displaying a plurality of graphical results on a user interface using a data acquisition and processing system; and
   selecting an amount and a type of drag reducing agent to be used for a specific mixture.

9. The method of claim 8, further comprising mixing a petroleum product with a polymer-based drag reducing agent to form the mixture.

10. The method of claim 8, wherein measuring the drag reduction of the mixture further comprises measuring torque reduction data of the mixture.

11. The method of claim 8, further comprising determining that the fluid flow is a turbulent or a laminar flow based on a shear rate, the viscosity data, and pressure drops.

12. The method of claim 8, further comprising processing of a measured data using a data acquisition and processing system.

13. The method of claim 11, further comprising selecting the amount and the type of drag reducing agent that reduces a torque at low shear rates.

14. The method of claim 8, further comprising measuring a change in friction upon adding a drag reducing agent.

* * * * *